US012586066B2

(12) United States Patent
Achkir et al.

(10) Patent No.: US 12,586,066 B2
(45) Date of Patent: Mar. 24, 2026

(54) FREIGHT MANAGEMENT SYSTEM

(71) Applicant: Cisco Technology, Inc., San Jose, CA (US)

(72) Inventors: D. Brice Achkir, Livermore, CA (US); Kaushal Sanjay Mhalgi, San Jose, CA (US); Gautam Khandelwal, Tracy, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 379 days.

(21) Appl. No.: 18/162,132

(22) Filed: Jan. 31, 2023

(65) Prior Publication Data

US 2024/0257119 A1 Aug. 1, 2024

(51) Int. Cl.
| | |
|---|---|
| *G06Q 20/38* | (2012.01) |
| *G06Q 10/0834* | (2023.01) |
| *G06Q 20/22* | (2012.01) |
| *G06Q 20/40* | (2012.01) |

(52) U.S. Cl.
CPC ..... *G06Q 20/389* (2013.01); *G06Q 10/08345* (2013.01); *G06Q 20/223* (2013.01); *G06Q 20/38215* (2013.01); *G06Q 20/405* (2013.01)

(58) Field of Classification Search
USPC .......................................................... 705/335
See application file for complete search history.

(56) References Cited

U.S. PATENT DOCUMENTS

| | | | |
|---|---|---|---|
| 11,037,095 B2 * | 6/2021 | Kim | ................... G06Q 10/0833 |
| 11,200,605 B2 | 12/2021 | Fisher | |

(Continued)

FOREIGN PATENT DOCUMENTS

| | | | |
|---|---|---|---|
| CN | 113282671 A | | 8/2021 |
| CN | 120705580 A | * | 9/2025 |

(Continued)

OTHER PUBLICATIONS

"Use of Smart Contracts in the dexFreight Platform," by Rajat Rajbhandari, Phd, Jun. 29, 2020 (Year: 2020).*

(Continued)

*Primary Examiner* — Michael P Harrington
*Assistant Examiner* — Brian Adams Heflin
(74) *Attorney, Agent, or Firm* — Edell, Shapiro & Finnan, LLC

(57) ABSTRACT

Methods that provide a blockchain network for entities to securely collaborate with respect to rate card data records and data transactions triggering various events. In these methods, a computing device obtains, from a first blockchain node of an enterprise, via a blockchain channel, a rate card data record that includes at least one unique identifier, primary information about the rate card data record, and a plurality of data values that change over time. The rate card data record is in a form of a distributed ledger blockchain. The computing device generates, using a set of rules in a smart contract, a data transaction based on one or more values in the rate card data record. The data transaction is in the form of the distributed ledger blockchain. The computing device further provides, to a second blockchain node, via the blockchain channel, the data transaction that triggers an executable event.

20 Claims, 7 Drawing Sheets

(56)     References Cited

U.S. PATENT DOCUMENTS

| | | | |
|---|---|---|---|
| 2004/0015392 A1* | 1/2004 | Hammel | G06Q 30/0284 705/13 |
| 2004/0088256 A1* | 5/2004 | Klein | G06Q 10/10 705/40 |
| 2007/0192218 A1* | 8/2007 | Licardi | G06Q 40/12 705/30 |
| 2012/0016721 A1* | 1/2012 | Weinman | G06Q 30/0206 705/7.35 |
| 2014/0032427 A1 | 1/2014 | Gannon | |
| 2014/0188754 A1* | 7/2014 | Viswanath | G06Q 10/08345 705/342 |
| 2015/0339738 A1* | 11/2015 | Munaswamy | G06Q 30/0283 705/409 |
| 2017/0243193 A1 | 8/2017 | Manian et al. | |
| 2018/0218343 A1 | 8/2018 | Kolb et al. | |
| 2019/0347654 A1* | 11/2019 | Lu | H04L 9/0825 |
| 2020/0034788 A1 | 1/2020 | Ynion, Jr. | |
| 2020/0372014 A1* | 11/2020 | Boshmaf | G06F 16/245 |
| 2021/0073754 A1* | 3/2021 | Lingala | G06Q 20/382 |
| 2021/0150517 A1 | 5/2021 | Xiao et al. | |
| 2021/0184834 A1* | 6/2021 | DeValve | H04L 9/3239 |
| 2021/0248543 A1 | 8/2021 | Fernandes et al. | |
| 2021/0398093 A1* | 12/2021 | Lynch | G06Q 20/389 |
| 2022/0070297 A1* | 3/2022 | Rice | H04M 15/8055 |
| 2023/0162111 A1* | 5/2023 | Menipaz | G06Q 10/08 705/7.17 |
| 2023/0259919 A1* | 8/2023 | Dorward | G06Q 20/389 705/66 |
| 2023/0274273 A1* | 8/2023 | Jacob | G06F 21/64 705/75 |
| 2023/0393829 A1* | 12/2023 | Panikkar | G06F 11/3409 |

FOREIGN PATENT DOCUMENTS

| | | | |
|---|---|---|---|
| JP | 2012086940 A | * | 5/2012 |
| WO | 2020/119286 A1 | | 6/2020 |

OTHER PUBLICATIONS

Álvarez-Diaz, et al., "Smart Contracts based on Blockchain for Logistics Management," IML '17: International Conference on Internet of Things and Machine Learning, Oct. 2017, 8 pages.

* cited by examiner

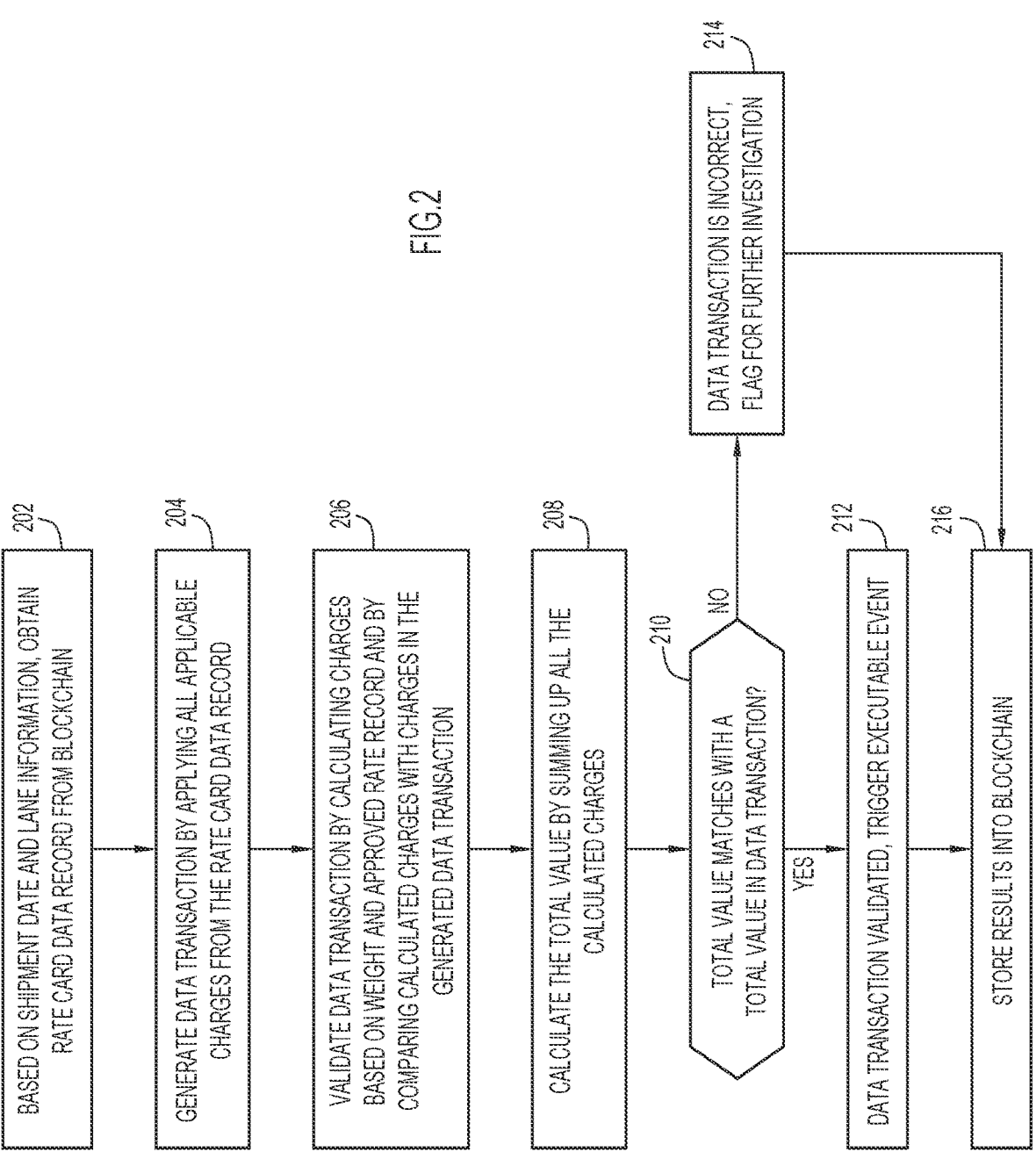

202 — BASED ON SHIPMENT DATE AND LANE INFORMATION, OBTAIN RATE CARD DATA RECORD FROM BLOCKCHAIN

204 — GENERATE DATA TRANSACTION BY APPLYING ALL APPLICABLE CHARGES FROM THE RATE CARD DATA RECORD

206 — VALIDATE DATA TRANSACTION BY CALCULATING CHARGES BASED ON WEIGHT AND APPROVED RATE RECORD AND BY COMPARING CALCULATED CHARGES WITH CHARGES IN THE GENERATED DATA TRANSACTION

208 — CALCULATE THE TOTAL VALUE BY SUMMING UP ALL THE CALCULATED CHARGES

210 — TOTAL VALUE MATCHES WITH A TOTAL VALUE IN DATA TRANSACTION?

NO

214 — DATA TRANSACTION IS INCORRECT, FLAG FOR FURTHER INVESTIGATION

YES

212 — DATA TRANSACTION VALIDATED, TRIGGER EXECUTABLE EVENT

216 — STORE RESULTS INTO BLOCKCHAIN

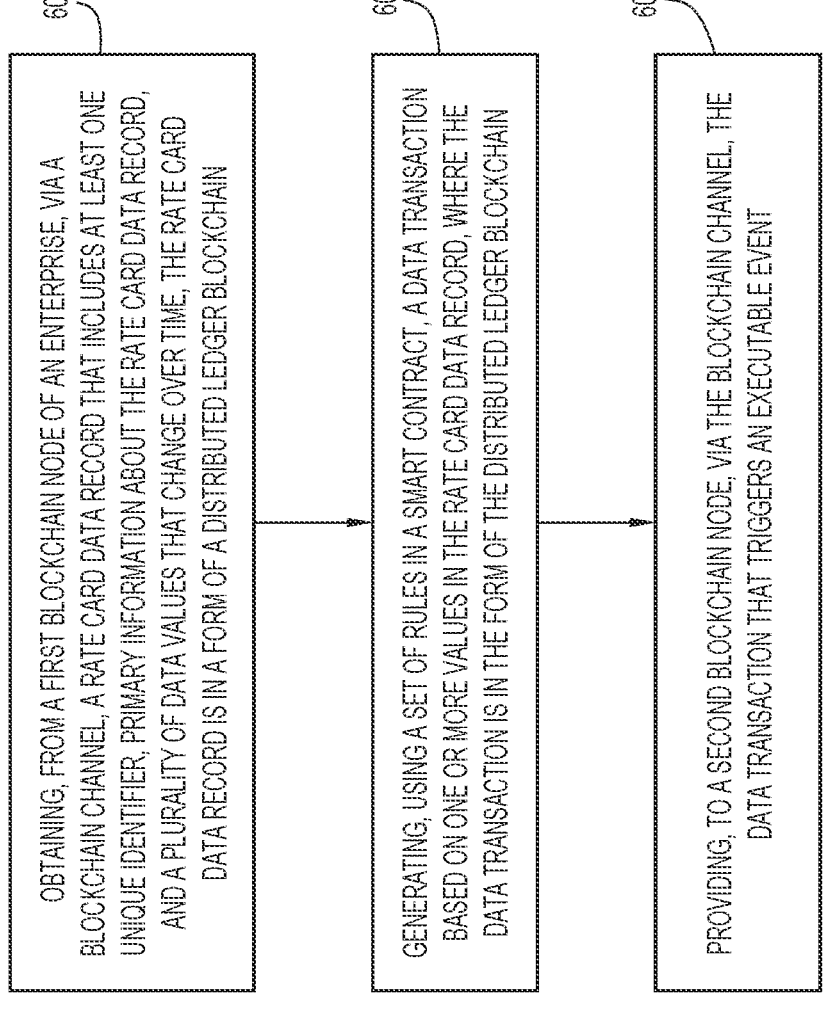

602

OBTAINING, FROM A FIRST BLOCKCHAIN NODE OF AN ENTERPRISE, VIA A BLOCKCHAIN CHANNEL, A RATE CARD DATA RECORD THAT INCLUDES AT LEAST ONE UNIQUE IDENTIFIER, PRIMARY INFORMATION ABOUT THE RATE CARD DATA RECORD, AND A PLURALITY OF DATA VALUES THAT CHANGE OVER TIME, THE RATE CARD DATA RECORD IS IN A FORM OF A DISTRIBUTED LEDGER BLOCKCHAIN

604

GENERATING, USING A SET OF RULES IN A SMART CONTRACT, A DATA TRANSACTION BASED ON ONE OR MORE VALUES IN THE RATE CARD DATA RECORD, WHERE THE DATA TRANSACTION IS IN THE FORM OF THE DISTRIBUTED LEDGER BLOCKCHAIN

606

PROVIDING, TO A SECOND BLOCKCHAIN NODE, VIA THE BLOCKCHAIN CHANNEL, THE DATA TRANSACTION THAT TRIGGERS AN EXECUTABLE EVENT

FREIGHT MANAGEMENT SYSTEM

TECHNICAL FIELD

The present disclosure generally relates to data networks and data management systems.

BACKGROUND

Logistic partners of an enterprise form unique agreements for various routes and transportation modes. In freight systems, a route is typically referred to as a freight lane, which is a route that a carrier such as a logistic partner covers on a regular schedule such as a direct point-to-point connection or multiple point connections, etc. Regular schedule involves transports that are periodically performed e.g., daily, weekly, monthly, etc. Transportation modes typically involve trucking, by train, by air, and/or by water. One enterprise may use multiple logistic partners to transport products, may implore various freight lanes, and may use different transport modes. Managing transport of enterprise products is a complicated and complex task.

BRIEF DESCRIPTION OF THE DRAWINGS

FIG. 2 is a flowchart illustrating a method of generating one or more data transactions that trigger an executable event, according to an example embodiment.

FIG. 6 is a flowchart illustrating a method of providing a data transaction that triggers an executable event, according to an example embodiment.

DETAILED DESCRIPTION

Overview

Figure 1:
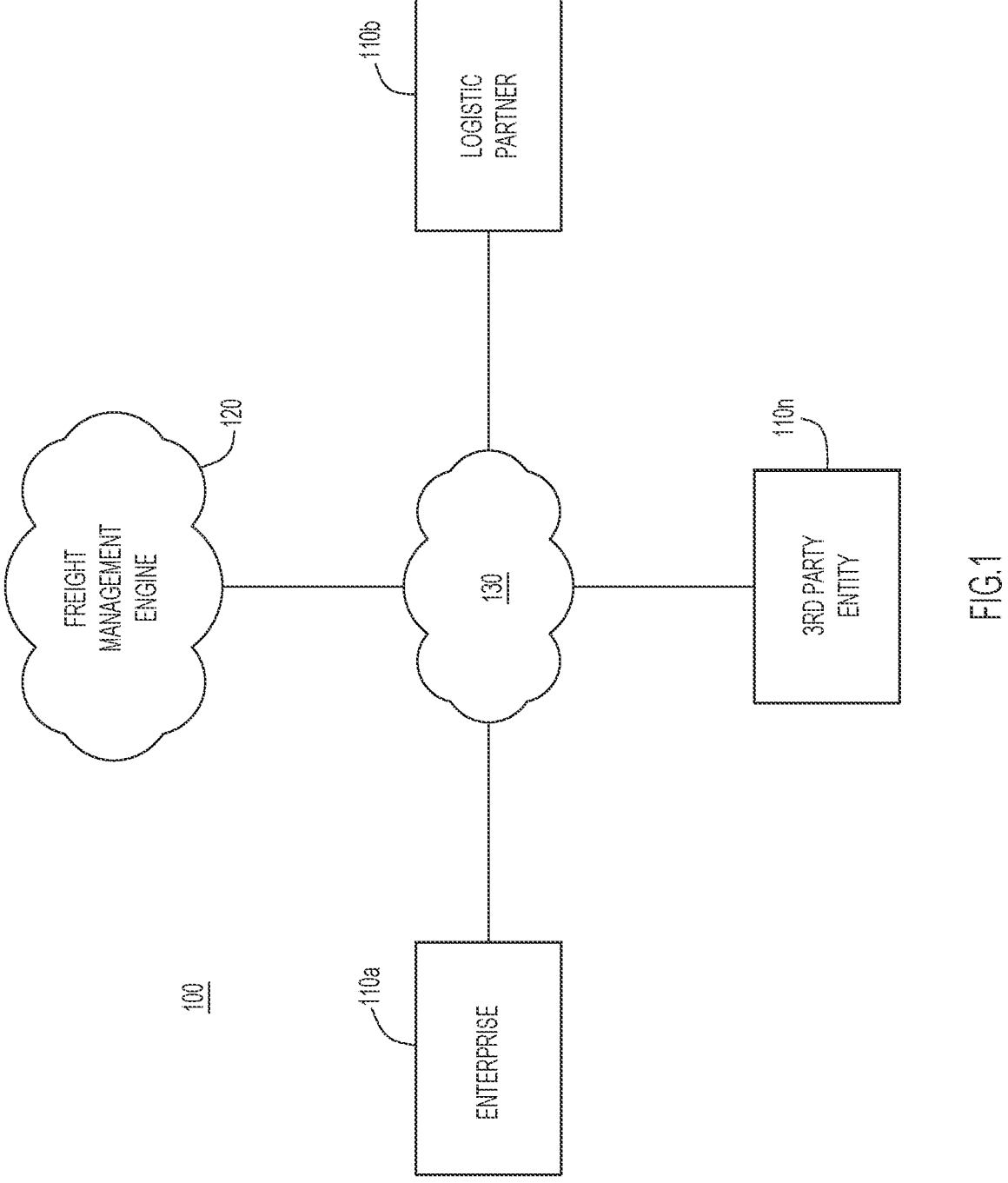
FIG. 1 is a block diagram illustrating a data network environment that includes a freight management engine for managing rate card data records and data transactions in a blockchain, according to an example embodiment.

Techniques presented herein provide a private blockchain network in which entities securely collaborate with respect to rate card data records and data transactions, thereby triggering various events.

In one form, a computing device obtains, from a first blockchain node of an enterprise, via a blockchain channel, a rate card data record that includes at least one unique identifier, primary information about the rate card data record, and a plurality of data values that change over time. The rate card data record is in a form of a distributed ledger blockchain. The computing device generates, using a set of rules in a smart contract, a data transaction based on one or more values in the rate card data record. The data transaction is also in the form of the distributed ledger blockchain. The computing device further provides, to a second blockchain node, via the blockchain channel, the data transaction that triggers an executable event.

Example Embodiments

Managing transport of enterprise products, commonly referred to as freight management, involves multiple entities and steps. For each logistic partner of an enterprise and each transportation mode, there are associated cost rates. These cost rates may include 10,000 or more records and are typically stored in a form of an excel file. Based on negotiations between an enterprise and logistic partners, cost rates are approved. The agreed upon rates are then stored in this excel file. Next, shipments of enterprise products are planned e.g., using Oracle Transport Management (OTM) systems. Once the shipments are arranged, data transactions such as invoices are generated by each logistic partner. The logistic partners then provide the data transactions e.g., invoices, to a third-party entity e.g., an auditing system, for an audit (a data transaction reconciliation process). The data transaction reconciliation process is only known to the third-party entity and often is a black box process for the enterprise and its logistic partners.

To validate data transactions in the data transaction reconciliation process, the same copy of rate card data record should be maintained in real-time in at least three locations (at the enterprise, at the logistic partner, and at the third-party). These three different entities have different data management systems and databases to accurately plan shipments, generate data transactions, and reconcile these data transactions. In related art, this process is manually performed. It is asynchronous and causes delays in almost every step of the process. It is further error prone and may result in discrepancies. Additionally, multiple sync operations are required such as meetings, conference calls, etc. to resolve various issues in this process. Moreover, data transactions may be audited manually, which causes further delays in rendering payments and shipping products. Additionally, in related art, the process may result in overpayments that enterprise does not recover through the data transaction reconciliation process.

The techniques presented herein provide for a data management system that generates digitized rate cards and data transactions therefrom. The data management system further performs a data transaction reconciliation process for triggering payment events and/or shipment events based on validated data transactions in real-time, on the fly, and/or dynamically.

These techniques provide a blockchain network for a smart contract in which entities securely collaborate on rate card data records, data transactions, and/or perform a data transaction reconciliation process on the same channel. The information is in a form of a distributed ledger and is shared only with the intended entities. The blockchain channel may include an enterprise node and a partner node. Each node has a certificate of authority (CA), a ledger, and the same copy of a chain code. The blockchain data platform speeds up the data management process by executing various tasks and by managing various data records. The techniques presented herein avoid delays and errors associated with management of a complex process such as the freight management process.

While one or more example embodiments presented below describe a freight management system, this is just one example. The techniques apply to various data management networks and systems depending on a particular deployment and use case scenario. The techniques are not limited to smart contracts and may deploy other policies and/or rules. The techniques apply to various data records stored in a blockchain that are a part of a complex process and involve at least two entities.

FIG. 1 is a block diagram illustrating a data network environment 100 which includes a freight management engine for managing rate card data records and data transactions in a blockchain, according to an example embodiment. The data network environment 100 includes entities 110a-n, a freight management engine 120, and a network 130 that allows the entities and the freight management engine to interact with one another.

The notations "a-n", "a-m, "a-k," "a-j", "1-n", and the like, illustrate that the number of elements can vary depending on a particular implementation and is not limited to the number of elements being depicted or described. Moreover, this is only examples of various components, and the number and types of components, functions, etc. may vary based on a particular deployment and use case scenario.

Entities 110a-n may include an enterprise 110a, a logistic partner 110b, and a 3$^{rd}$ party entity 110n such as vendors, auditors, telemetry collectors, etc. The enterprise 110a may manufacture one or more products that require shipment to other enterprises. In one example embodiment, the logistic partner 110b may be a freight enterprise that arranges shipments of the enterprise products. The logistic partner 110b manages cost rates associated with the shipments. The logistic partner 110b may be involved in cost rate negotiations with the enterprise 110a and one or more shipment enterprises. The 3$^{rd}$ party entity 110n may be an auditing entity that validates data transactions. For example, the 3$^{rd}$ party entity 110n may be configured to validate various invoices generated for shipment of the enterprise products. The 3$^{rd}$ party entity 110n perform a data transaction reconciliation process for example, to determine if applied charges are correct and to avoid overpayments by the enterprise 110a.

Entities 110a-n interact with each other and the freight management engine 120 using one or more user devices. These user devices are any suitable device such as data source device and/or data sink device. The user devices may be a computer, an enterprise device, an appliance, an Internet of Things (IoT) device, a Personal Digital Assistant (PDA), a laptop or electronic notebook, a smartphone, a tablet, and/or any other device and/or combination of devices, components, elements, and/or objects capable of initiating voice, audio, video, media, or data exchanges within the data network environment 100. A user device may also include any suitable interface to a human user such as a microphone, a display, a keyboard, or other terminal equipment. The use device may be configured with appropriate hardware (e.g., processor(s), memory element(s), antennas and/or antenna arrays, baseband processors (modems), and/or the like such as those depicted and described in further detail in FIG. 6), software, logic, and/or the like to facilitate respective Over-the-Air (OTA) interfaces for accessing/connecting to a blockchain of the freight management engine 120 and sending or receiving packets.

The freight management engine 120 is a platform based blockchain that may address at least some of the problems of the freight management process mentioned above. The freight management engine 120 includes a blockchain that stores rate card data records and/or data transactions and a smart contract that defines a set of rules that govern interactions with the blockchain. The smart contract defines data structures for storing rate card data records and/or data transactions and executable code to access the data. The freight management engine 120 generates rate card data records and/or data transactions. The freight management engine 120 further provides a blockchain channel on which the entities 110a-n securely collaborate with respect to the rate card data records and/or data transactions and collaboratively perform the data transaction reconciliation process.

The freight management engine 120 may avoid delays associated with rate card negotiations and data transaction reconciliation process. The freight management engine 120 may further avoid discrepancies between planned shipments of enterprise products and data transactions. The freight management engine 120 triggers various executable events such as payment events in which a payment is rendered and/or shipment events in which a product is shipped based on integrating with one or more transport management systems. The freight management engine 120 has unique attributes for inserting intelligence into a complex freight management process. By providing the same blockchain channel, the entities 110a-n use the exact same ledger and obtain the same rate card data records in real-time. Moreover, the rate card data records may be in a chronological order and sorted according to whether values are approved or being negotiated.

Figure 7:
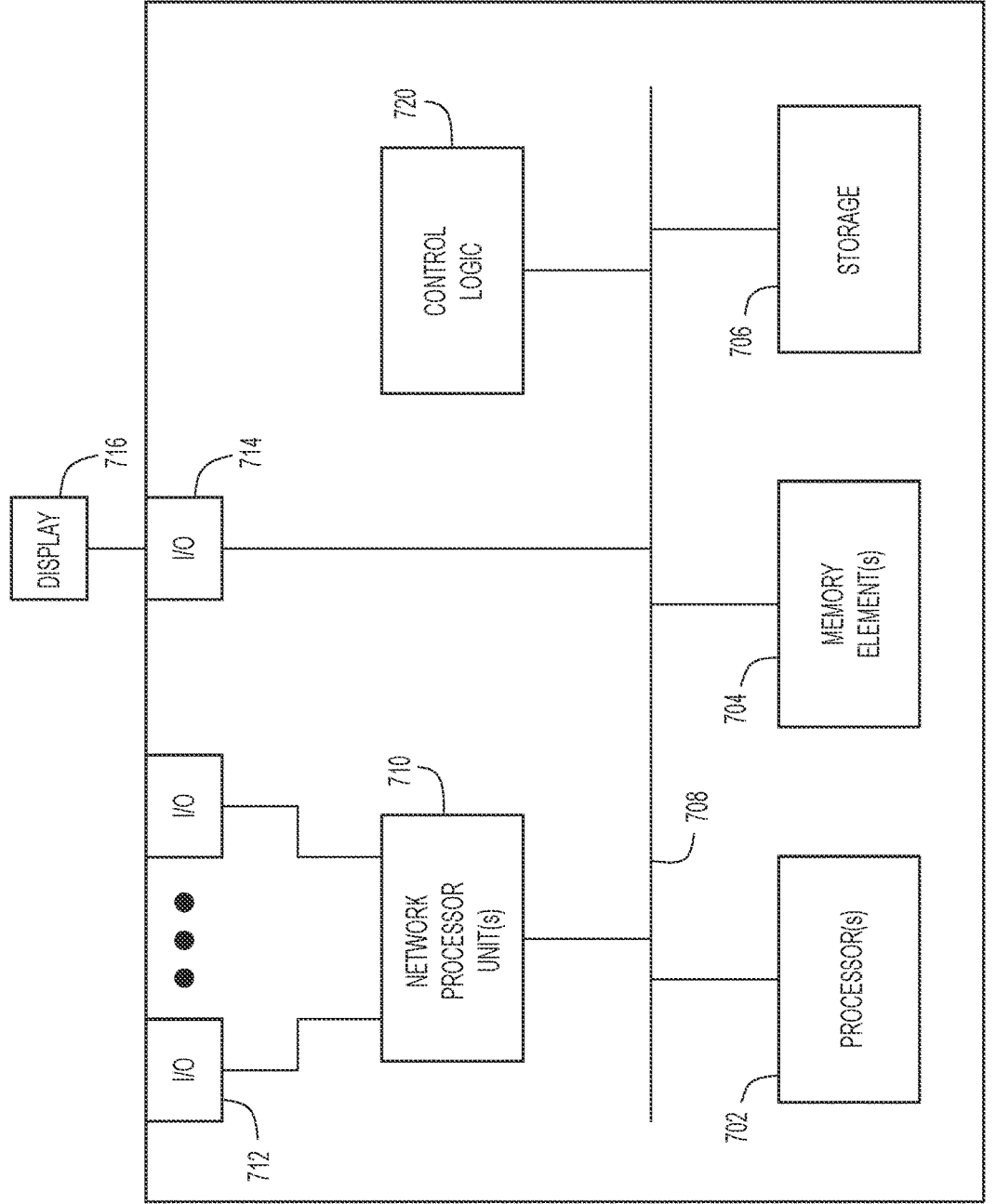
FIG. 7 is a hardware block diagram of a computing device that may perform functions associated with any combination of operations in connection with the techniques depicted and described in FIGS. 1-6, according to various example embodiments.

The freight management engine 120 may be deployed on one or more servers and may be configured with appropriate hardware (e.g., processor(s), memory element(s), antennas and/or antenna arrays, baseband processors (modems), and/or the like such as those depicted and described in further detail in FIG. 7), software, logic, and/or the like to facilitate respective Over-the-Air (OTA) interfaces for accessing/connecting to, sending or receiving packets or data such as queries and/or data records to and from the entities 110a-n. The freight management engine 120 may be hosted in a cloud as a web service such that the blockchain network (the blockchain) and platform(s) are set up and hosted in the cloud. Thus, the entities 110a-n need no intensive setups to connect to the freight management engine 120 and may simply use the network 130 (e.g., Internet) to connect to the freight management engine 120.

The network 130 may include one or more networks that allow the entities 110a-n and the freight management engine 120 to communicate with one another. The network 130 may include, but is not limited to, any local area network (LAN), wide area network (WAN), wired and/or wireless access networks, an enterprise network (private networks), public network such as the Internet, and/or virtual networks.

This is only an example of the data network environment 100, and the number and types of entities may vary based on a particular deployment and use case scenario, such as the type of service being provided, entities involved in the service, and/or network structures.

With continued reference to FIG. 1, FIG. 2 is a flowchart illustrating a method 200 of generating one or more data transactions that trigger an executable event, according to an example embodiment. The method 200 may be performed by the freight management engine 120 of FIG. 1.

The method 200 involves at 202, based on shipment date and lane information, the freight management engine 120 obtains a rate card data record from a blockchain. Rate card data records are digitally written, uploaded, and stored within the blockchain with many policies and rules that control the input of data through templates and set of rules (via the smart contract). The freight management engine 120 fetches the rate card data record, from a plurality of rate card data records, that matches the selected shipment date and lane information.

At 204, the freight management engine 120 generates a data transaction such as an invoice by applying all applicable charges obtained from the rate card data record. That is, an entity such as the logistic partner 110*b* of FIG. 1 interacts with the freight management engine 120 to generate data transactions (e.g., invoices) directly into their own node using the smart contract. The data transactions trigger one or more executable events such as rendering payments and/or shipping enterprise products.

The method 200 may further include a data transaction reconciliation process, which involves interactions with another entity such as the $3^{rd}$ party entity 110*n* of FIG. 1. Specifically, the $3^{rd}$ party entity 110*n* obtains the applicable rate card data record and at 206, validates the data transaction. The freight management engine 120 may use the smart contract to perform the data transaction reconciliation process in which an uploaded data transaction is validated (correct data values).

For example, the freight management engine 120 calculates freight charges based on weight using the applicable rate card data record i.e., approved rates therein. The freight management engine 120 then compares the calculated charges with charges in the generated data transaction to determine if the data values are correct. At 208, a total value is calculated by summing up all the charges calculated at 206. At 210, the freight management engine 120 determines whether the total value matches the total value in the generated data transaction. If the total values match (charges are correct), at 212, the data transaction is validated and an executable event is triggered.

When there are no discrepancies in the generated data transaction, executable event such as rendering payment for the logistic partner 110*b* is triggered. The executable event may further involve integrating with one or more transport management systems to cause a shipment of one or more enterprise products e.g., generate a shipping label and a tracking number, obtain the enterprise product, etc.

If the data transaction is determined to have one or more errors (charge discrepancies or entry errors), at 214, the data transaction is flagged for further investigation. For example, the freight management engine 120 may generate a notification to the $3^{rd}$ party entity 110*n* indicating that the data transaction is invalid (charges are incorrect). The freight management engine 120 further records the determined discrepancies in the blockchain.

At 216, the results of performing the data transaction reconciliation process along with the data transaction are stored in the blockchain.

Figure 3:
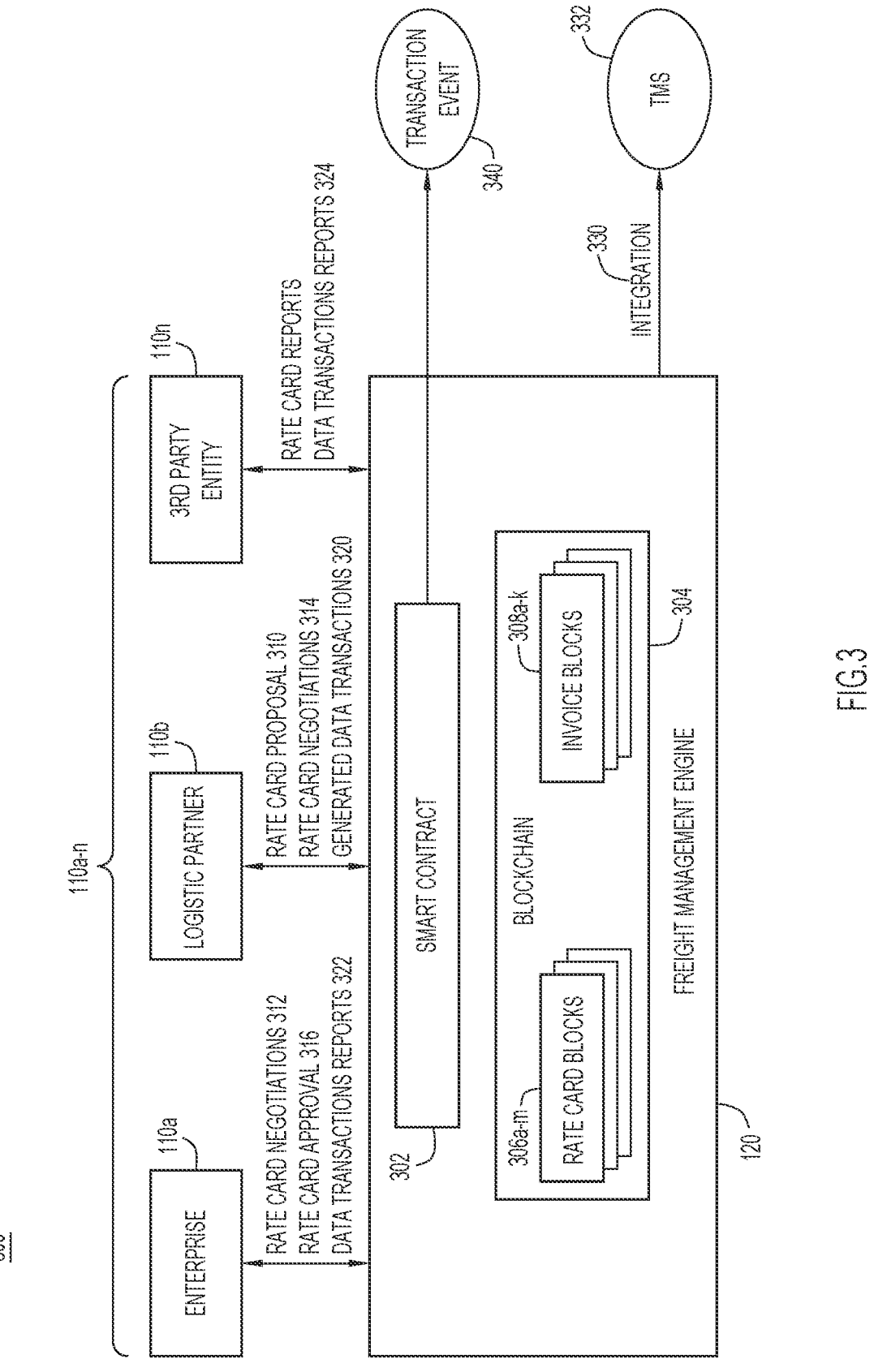
FIG. 3 is a diagram illustrating a freight management system that manages rate negotiations and data transactions, according to an example embodiment.

With continued reference to FIGS. 1 and 2, FIG. 3 is a diagram illustrating a freight management system 300 that manages rate negotiations and data transactions, according to an example embodiment. The freight management system 300 includes entities 110*a-n* of FIG. 1 and the freight management engine 120 of FIG. 1. Specifically, the freight management engine 120 includes a smart contract 302 and a blockchain 304.

The smart contract 302 defines rules that govern interactions with the blockchain 304. Interactions may include any CRUD operations such as generating new data records in the blockchain 304, deleting data records in the blockchain 304, updating or editing data records in the blockchain 304, and/or viewing data records stored in the blockchain 304. For example, the smart contract 302 authenticates one or more of the entities 110*a-n* to access the blockchain 304 and determines permitted or authorized interactions i.e., access rules that govern reading, writing, updating, deleting, etc. into the blockchain 304.

In one example embodiment, the smart contract 302 defines a first set of rules for sharing data stored in the blockchain 304. The smart contract 302 defines a second set of rules that permit only the enterprise 110*a* to generate new rate card data records that may be updated by the enterprise 110*a* and the logistic partner 110*b* during a negotiation process for example. In one example, the smart contract 302 authorizes or authenticates the enterprise 110*a* to generate or access the rate card blocks 306*a-m* but not the logistic partner 110*b* nor the $3^{rd}$ party entity 110*n*. The smart contract 302 then permits the logistic partner 110*b* to generate data transactions and record them into the blockchain 304 but not the $3^{rd}$ party entity 110*n*. The smart contract 302 permits the $3^{rd}$ party entity 110*n* such as an auditing system, to view the rate cards stored in the blockchain 304 but not to make any changes to these rate cards.

The smart contract 302 may further define a third set of rules that govern structures for storing data in the blockchain 304. For example, the smart contract 302 may include a first subset of rules that define data structure and format for the rate card data record and a second subset of rules that define the data structure and format for the data transactions. For example, the data records are in a Java Script Object Notation (JSON) format.

These are just a few non-limiting examples of the rules defined in the smart contract 302.

The blockchain 304 includes one or more permissioned ledgers that store various data such as rate cards and/or data transactions, used for coordinating between the entities 110*a-n* e.g., auditing, tracking, billing, management, historical trends, insights, etc. The blockchain 304 may include one or more blockchain nodes which implement and maintain one or more blockchains in a form of a distributed ledger blockchain, described in FIG. 5. The blockchain nodes may include one or more servers and/or executable software application on a computing device such as the one in FIG. 7, a virtual machine, etc. When multiple ledgers are provided, same or different blockchain nodes implement each ledger, depending on a particular deployment and use case scenario. Ledgers are blockchains or data objects that are stored in a datastore such as remote, distributed, and/or local memory. In one example embodiment, the blockchain 304 is a permissioned blockchain or a distributed blockchain such as a Hyperledger blockchain. The Hyperledger blockchain stores secure information in the form of the distributed ledger.

Typically, public blockchains have minimum security on data accessibility and can be accessed by any party in the public domain. While some restrictions may be implemented using the smart contract 302, for example, these restrictions need to be generic enough for the whole public (all entities) and the data may be viewed by all entities. Unlike public blockchains, the blockchain 304 is controlled in terms of data security and confidentiality. Since the blockchain 304 is a permissioned blockchain, it has channels and the ledger is distributed only among the entities 110*a-n* that share the same channel (i.e., ledgers of the blockchain nodes are synchronized with one another). Other entities (e.g., other logistic partners) that are not part of the blockchain channel cannot access the data in the blockchain 304. Select entities that are on the same channel share the chain code and the ledger, thereby the same rules are applied for data management and the same data is visible at a particular moment or time. Other entities that are not part of the same blockchain channel cannot access the distributed ledger.

Data confidentiality and transparency are needed because rate card data records and invoice information are highly confidential. At the same time, rate card negotiations are based on trust and once a rate card is approved, it needs to be applied for generating data transactions; therefore, any updates by any entities voluntarily can cause a financial loss and discrepancies.

In one example embodiment, the rate card data records are stored in the blockchain 304 as rate card blocks 306*a-m* that form a rate card blockchain. Each of the rate card blocks 306*a-m* includes a rate record identification, primary information such as the transport mode, the service type, etc. and multiple data values such as approved and/or negotiated dates, weight values, price values, etc. Data values that are being negotiated and/or approved such as dates, prices, weight, etc. are subject to change over time e.g., based on being negotiated. For example, a rate charge may be transformed from a negotiated value to an approved value that is to be applied in generating data transactions.

The rate card data record may include the following data structure:

```
{
    Rate Card ID: Text
    Status: Text
    LANE: Text
    Approved: {
        //List of Rate Card attributes approved
    }
    Negotiated: {
        //List of Rate Card attributes negotiated
    }
}
```

A schema for the rate card includes an assigned unique identifier that uniquely identifies the rate card data record. For example, the smart contract 302 generates the unique identifier by encoding various attributes of the rate card data record such as the primary information (e.g., a freight mode, a service type, a freight lane, one or more entity identifiers that uniquely identifies entities that collaboratively exchange information using the blockchain channel, etc.)

The smart contract 302 further generates the status of the rate card. The status is assigned as follows active if the rate card is currently being used or inactive (previously been used, older version of the active rate card, used for specific events e.g., holidays, etc.). The status may be assigned to indicate whether the rate card is not yet active (e.g., in negotiations—new rate card). The status may be assigned to indicate which entity needs to review the changed values such as proposed new charge rates (e.g., waiting on the enterprise 110*a* to approve).

The plurality of data values in the rate card include a first list of approved values and a second list of values being negotiated by the enterprise 110*a* and one of its logistic partners. The plurality of data values may be price-related values e.g., cost rates, dates, weights, etc. By storing approved values separately from the negotiated values, changes within the rate card are highlighted and are easy to detect. Further, the negotiated values are transformed to approved data values based on negotiations among the enterprise 110*a* and the respective logistic partner. They are transformed by being moved from the first list to the second list.

The invoice blocks 308*a-k* are examples of data transactions recorded in the blockchain 304. An invoice block includes a unique identifier and primary information such as shipment tracking number and data values that change over time such as charges incurred, shipment delivery date, etc. The invoice block may further include data values such as charges incurred, differences after performing the data transaction reconciliation process, etc.

The invoice block record may include the following structure:

```
{
    Invoice ID: Text
    Status: Text
    Shipment Tracking#: Text
    Weight: Text
    Shipment Date: Date
    Source: Text
    Destination: Text
    //List of charges and their values
    //List of differences in the charges after the reconciliation
}
```

The invoice identifier uniquely identifies the data transaction and may be an encoded value of combined primary information such as encoding (1) entity identifiers, (2) freight lane, (3) source identifier, (4) destination identifier, (5) transportation mode, etc. The status of the data transaction is assigned based on whether the data transaction is being approved, has been approved, has been validated, paid, etc. Additionally, the data transaction includes dates such as shipment date, delivery date, generation date, etc. The data transaction may further include additional attributes such as the origin of shipment, the destination, the tracking number, products being shipped, etc.

The data transaction includes information uploaded by the logistic partner 110*b* as part of a data transaction, e.g., the invoice. When the data transaction is uploaded, it is also reconciled by the smart contract 302 and the results of the reconciliation process are also stored into the data transaction (list of differences) in the invoice blocks 308*a-k* of the blockchain 304.

The freight management engine 120 allows the entities 110*a-n* to collaboratively communicate with one another to manage the freight process such as negotiate charge rates in the rate card blocks 306*a-m* and/or to generate data transactions (invoice blocks 308*a-k*) to render payments and/or arrange shipments of the enterprise products.

In the rate card negotiations process, at least one first price-related data value that is being negotiated is transformed into a second price-related data value that is approved based on an authorization from a first blockchain node of the enterprise 110*a* and a second blockchain node of the logistic partner 110*b*. The updated rate card data record is then recorded in the blockchain 304 and used to generate data transactions.

In one example embodiment, the rate card negotiations process may involve at 310, the logistic partner 110*b* uploading one or more proposed rate cards (rate card proposal) for a freight lane into the blockchain 304 using the smart contract 302. The smart contract 302 ensures that only authorized rates are added to the rate card and further applies the rate card validation rules before storing the proposed rate card into the blockchain 304 with the status "New", for example. The enterprise 110*a* obtains the exact same rate card data record in real time through the same copy of the smart contract 302. That is, the enterprise 110*a* may be notified that a new rate card (with new cost rates) is being proposed.

At 312, the enterprise 110*a* may edit and/or modify the new rate card using the smart contract 302. Changes made by the enterprise 110*a* are visible to the logistic partner 110*b* in real-time via the blockchain channel.

At 314, the logistic partner 110*b* may also edit and/or modify the values in the new rate card. At this point, optionally, the enterprise 110*a* and the logistic partner 110*b* may decide to conduct a meeting (in person or virtual) to further negotiate charges, dates, and/or other attributes associated with shipments and payments.

At 316, when the values are approved by entities involved in the negotiation process, the values are transformed from the negotiated data values to the approved data values and are then used to generate data transactions. When the rates (data values) are finalized, the enterprise 110*a* and/or the logistic partner 110*b* approve the new rate card using the smart contract 302.

The smart contract 302 ensures that only an authorized user and only from the logistic partner 110*b* approves the new rate card using the second blockchain node of the logistic partner 110*b*. The smart contract 302 then saves the approved rate card with the status 'Partner Approved' on the same chain of the rate card blocks 306*a-m*. Once the logistic partner 110*b* approves the new rate card, a notification is sent to the enterprise 110*a* upon which an authorized user can approve the new rate card data record, which is then written into the rate card blocks 306*a-m* using the smart contract 302. The smart contract 302 ensures that only authorized user and only from the first blockchain node of the enterprise 110*a* approves the rate card data record. The status of the rate card data record is then updated to: "current" or "active". This completes the negotiation process between the enterprise 110*a* and the logistic partner 110*b* for one or multiple rate card data records.

Additionally, the smart contract 302 generates one or more data transactions e.g., invoices, based on the rates in the approved rate card data records. In one example embodiment, at 320, the logistic partner 110*b* uploads one or more invoices, using the smart contract 302. The smart contract 302 ensures the authenticity of the uploader (the blockchain node of the logistic partner 110*b*). The smart contract 302 also finds a matching rate record from the rate card blocks 306*a-m* and uses approved data values therein to generate invoices. The invoices are then stored in the invoice blocks 308*a-k* in a form of the distributed ledger blockchain. Optionally, at 322, the enterprise 110*a* may generate various data transactions and also provide them as data transactions reports, which are also stored in the invoice blocks 308*a-k* of the blockchain 304.

At 324, the smart contract 302 further interacts with the $3^{rd}$ party entity 110*n* to perform the data transactions reconciliation process in real time in which the one or more data transactions are determined to be valid and/or as containing errors (charge discrepancies or entry errors). The reconciliation results are also written to the invoice blocks 308*a-k* of the blockchain 304. The invoice blocks 308*a-k* with the reconciliation results may be accessed/viewed by the enterprise 110*a*, the logistic partner 110*b*, and the $3^{rd}$ party entity 110*n* i.e., entities on the same blockchain channel. The $3^{rd}$ party entity 110*n* obtains applicable rate cards from the rate card blocks 306*a-m* using the smart contract 302 and applies approved data values therefrom to validate charges in the data transactions (determine whether data values are correct).

For the data transactions that are correctly calculated (no errors have been found) the freight management engine 120 generates one or more executable events. For example, at 330, a shipment event may be generated. In the shipment event, the freight management engine 120 integrates with a transport management system (TMS) 332 to cause a shipment of one or more enterprise products. As another example, a transaction event 340 may be generated such as a payment transaction in which a payment is rendered. The status of the respective invoice block may then be updated to indicate the status as "paid".

Additionally, the data transactions reports obtained at 322 and rate card reports and data transactions reports obtained at 324 may be obtained by the freight management engine 120 for analytics. Specifically, based on obtaining rate card data records and its history, which may be older versions of the same rate card data record, the freight management engine in pseudo-real time analyzes the trends, for example, it may determine one or more trends e.g., trucking transportation mode increased in price by more than 25% in the past three months. Based on determining the trends using rate card reports (that may include older versions of the same rate card) and/or data transactions reports, the freight management engine 120 generates insights for assign tasks e.g., business, to other entities or in negotiation process. The freight management engine 120 may use machine learning to detect trends in rate card blocks and/or data transactions.

For example, the freight management engine 120 may inform the enterprise 110*a* that product A should be changed to an air mode or transported by water based on a detected trend of price increase for the trucking mode. The freight management engine 120 may integrate with the TMS 332 to switch the shipment mode for the product A.

As another example, the freight management engine 120 may detect a trend of an incorrect value (wrong charge, wrong weight, etc.) in multiple data transactions generated by the logistic partner 110*b* for shipping a product B. Based on the detected trend, the freight management engine 120 may alert the logistic partner 110*b* of the repeated error and/or may generate an executable task that replaces the incorrect value in data transactions with a correct one.

These are just a few non-limiting examples of generating insights based on detected trends that may generated based on older versions of the same data record. Insights generated depend on a use case scenario and deployment of the management system.

While in FIG. 3, the enterprise 110*a* collaboratively communicates with only one logistic partner 110*b*, example embodiments are not limited thereto. The freight management system 300 may be scaled to any number of logistic partners with a copy of the same smart contract 302. This is only an example of the freight management system 300, and the components may vary based on a particular deployment and use case scenario, such as the type of service being provided, entities present, and/or network structures.

With continued reference to FIGS. 1-3, FIG. 4 is a diagram illustrating an application programming interface 400 of blockchain nodes for interacting with a blockchain, according to an example embodiment.

The application programming interface 400 includes user interfaces 402*a-p* that may be executing on user devices of the entities 110*a-n* of FIG. 1. The entities include an enterprise 410*a* such as the enterprise 110*a* of FIGS. 1 and 3, a first logistic partner 410*b*, and a second logistic partner 410*c* such as the logistic partner 110*b* of FIGS. 1 and 3. The entities securely communicate with a blockchain 420 using the backend APIs 412*a-q*. The backend APIs 412*a-q* include a common API 412*a*, a first channel API 412*b*, and a second channel API 412*c*. The enterprise 410*a* communicates with the first logistic partner 410*b* using a first blockchain channel 414*a* and with the second logistic partner 410*c* using a second blockchain channel 414*b*.

The entities use the user interfaces 402*a-p* running on the respective user devices to interact with the blockchain 420 through the backend APIs 412*a-q*. JSON is used for exchanging data and/or messages. For example, a JSON message may include data such as:

```
save {
    [approved values (k1:v1, k2:v2)];
    [negotiated values (k1:v1, k2:v2)];
    [header (k1:v1, k2:v2)];
    {
``` where "k" defines a field name (key) and "v" define a data value.

The common API 412*a* for a node server includes instructions for parsing the JSON message, making function calls to a smart contract such as the smart contract 302 of FIG. 3, declaring a break-down policy, and data model declarations such as the data structures of the rate card blocks 306*a-m* and the invoice blocks 308*a-k* of FIG. 3. The break-down policy confirms that data is structured properly to reduce redundancy in create, read, update, delete operations. For example, if data is split correctly, there is no need to retrieve non-required values while updating data.

The first channel API 412*b* and the second channel API 412*c* may be considered as a framework for the smart contract 302 of FIG. 3. Each channel API includes function calls to the common API 412*a*. For example, the function call may include a transaction type, a key, and a value. The channel API may obtain data model declarations and perform various operations such as save, get, delete, and/or query the common API 412*a* for one or more data values from the blockchain 420. The ledger and the code are localized to a particular channel. As such, any data stored on the first blockchain channel 414*a* cannot be accessed by an entity which is not on this first blockchain channel 414*a*. This means that the first logistic partner 410*b* cannot view data of the second logistic partner 410*c* and vice versa. In one example, NodeJS APIs include the APIs that does the data pre-processing and serves as the bridge between a user interface and the blockchain. Fabric APIs include the APIs that directly serve the blockchain to store, retrieve, and update the data.

Figure 5:
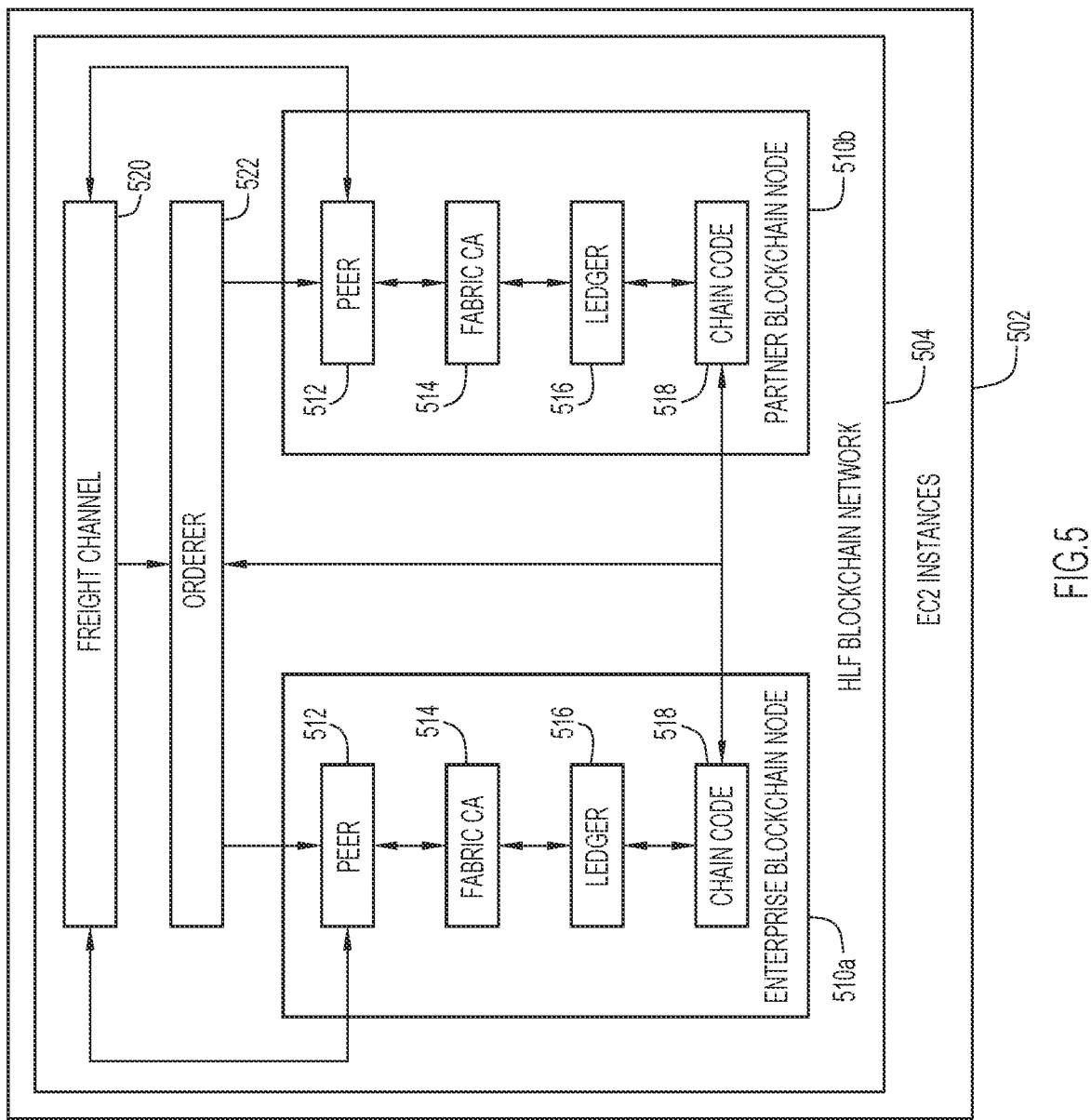
FIG. 5 is a diagram illustrating a blockchain channel 500 for securely communicating data among at least two blockchain nodes of at least two entities, according to an example embodiment.

FIG. 5 is a diagram illustrating a blockchain channel 500 for securely communicating data among at least two blockchain nodes of at least two entities, according to an example embodiment. The blockchain channel 500 may be deployed as an elastic compute cloud instance (EC2 instance) 502 that provides a Hyperledger fabric (HLF) blockchain network 504. The HLF blockchain network 504 includes at least two blockchain nodes: an enterprise blockchain node 510*a* and a partner blockchain node 510*b*, a freight channel 520, and an orderer 522.

Each blockchain node includes a peer instance 512, certificate authority (fabric CA) 514, a ledger 516, and the same copy of chain code 518. The peer instance 512 provided secure communication with the other blockchain node via a freight channel 520. The peer instance 512 has crypto material and blockchain node configuration. The CA 514 authenticates the respective blockchain node onto the blockchain channel 500. The ledger 516 includes the rate card data records and/or the data transactions. For example, the ledger 516 is a distributed ledger blockchain. The chain code 518 includes executable instructions such as the smart contract 302 of FIG. 3.

In one example embodiment, the enterprise blockchain node 510*a* includes a first peer instance, a first certificate of authority, a first ledger, and a first chain code. The partner blockchain node 510*b* includes a second peer instance, a second certificate of authority, a second ledger that is synchronized with the first ledger, and a second chain code that is a copy of the first chain code. The enterprise blockchain node 510*a* is substantially identical to the partner blockchain node 510*b* except for crypto material used for authentication and authorization of each transaction.

The freight channel 520 is a secure channel for communicating among the blockchain nodes in the HLF blockchain network 504. The orderer 522 ensures that data from one blockchain node is copied into the other blockchain nodes. The orderer 522 manages the ledger 516 such that any changes in the ledger 516 of the enterprise blockchain node 510*a* are copied into the ledger 516 of the partner blockchain node 510*b*. That is, the orderer 522 is configured to synchronize ledgers of blockchain nodes on the same blockchain channel 500.

The techniques presented herein generate digital rate cards and enable scalable digitization of workflows and entities involved in the freight management process. The techniques help avoid delays in a freight management process and help avoid discrepancies among tasks of the freight management process such as planned shipment, invoice generation, and invoice reconciliation. The techniques trigger executable events such as rendering an automatic payment to logistic partners based on the logistic partners uploading the invoices. The delay in payments may thus be reduced from an average of two weeks to two minutes. For example, the data transactions may be reconciled for a $3^{rd}$ party entity in real-time without delays thus trigger executable events such as render payment, arrange for shipment of a product by integrating with a transport management system. Since the $3^{rd}$ party is on the same channel, the $3^{rd}$ party has access and is able to view the results of the automated reconciliation process along with the rate records such that the $3^{rd}$ party only needs to perform manual reconciliation for exception cases. That is, the $3^{rd}$ party entity only needs to reconcile transactions and/or invoices in which errors were found i.e., the ones that failed the reconciliation process.

Additionally, the techniques presented herein apply machine learning to generate meaningful insights based on historic rate card data records and/or data transactions stored in a permissioned blockchain.

The techniques presented herein provide a blockchain channel that provides secure communication among the blockchain nodes present on that channel, using smart contract. No other entities may access the data in the blockchain. The data is in the form of a distributed ledger blockchain in which same copy of the rate card and data transactions are stored in a ledger of each blockchain node on the blockchain channel.

FIG. 6 is a flowchart illustrating a method 600 of providing a data transaction that triggers an executable event, according to an example embodiment. The method 600 may be performed by a freight management engine 120 of FIGS. 1 and 3.

The method 600 involves at 602, obtaining, from a first blockchain node of an enterprise, via a blockchain channel, a rate card data record that includes at least one unique identifier, primary information about the rate card data record, and a plurality of data values that change over time. The rate card data record is in a form of a distributed ledger blockchain.

The method 600 further involves at 604, generating, using a set of rules in a smart contract, a data transaction based on one or more values in the rate card data record. The data transaction is also in the form of the distributed ledger blockchain.

The method 600 further involves at 606, providing, to a second blockchain node, via the blockchain channel, the data transaction that triggers an executable event.

In one or more example embodiments, the method 600 may further include obtaining, from the second blockchain node, via the blockchain channel, a validation of the data transaction based on performing a transaction reconciliation process in which the data transaction is validated by determining whether correct data values from the rate card data record are applied in generating the data transaction. The method 600 may further include generating the executable event based on obtaining the validation of the data transaction.

In one form, the executable event may be a shipment event. The operation of generating the executable event may include integrating, using the smart contract, with one or more transport management systems to cause a shipment of one or more products.

In another form, the executable event may be a payment event. The operation of generating the executable event in the method 600 may include generating, using the smart contract, a payment transaction in which a payment is rendered and recording, using the smart contract, the payment into a blockchain.

In one instance, the plurality of data values may include at least one first price-related data value that is negotiated and at least one second price-related data value that is approved. The method 600 may further involve performing a rate negotiation process, using the smart contract, in which one of the at least one first price-related data value in the rate card data record is transformed into the at least one second price-related data value based on an authorization from the first blockchain node of the enterprise. The method 600 may further include recording, using the smart contract, an update rate card data record into a blockchain.

In another instance, the at least one unique identifier in the rate card data record may include a plurality of encoded attributes of the primary information including a transport lane, a status of the rate card data record, and a plurality of identifiers of a plurality of entities that are authorized to collaboratively exchange information using the blockchain channel.

In one or more example embodiments, the operation 604 of generating the data transaction may include generating a unique data transaction identifier, assigning a status for the data transaction, and determining a validity of each of a plurality of charges in the data transaction based on the plurality of data values in the rate card data record. The operation 604 of generating the data transaction may further include generating a first set of charge values from the plurality of charges determined to be valid and generating a second set of charge values from the plurality of charges determined to have one or more errors.

In one form, the method 600 may further include obtaining additional rate card data records, which are older versions of the rate card data record, determining at least one trend based on the rate card data record and the additional rate card data records, and generating at least one insight based on the at least one trend.

In another form, the operation 602 of obtaining the rate card data record may include obtaining a JSON data object that includes the rate card data record of a freight management system. The first blockchain node may include a first peer instance for securely communicating with the second blockchain node, a first certificate of authority to authenticate the first blockchain node onto the blockchain channel, a first ledger that includes the rate card data record and the data transaction, and a first chain code that includes the smart contract. The second blockchain node may include a second peer instance for securely communicating with the first blockchain node, a second certificate of authority to authenticate the second blockchain node onto the blockchain channel, a second ledger that is synchronized with the first ledger, and a second chain code that is a copy of the first chain code.

Figure 4:
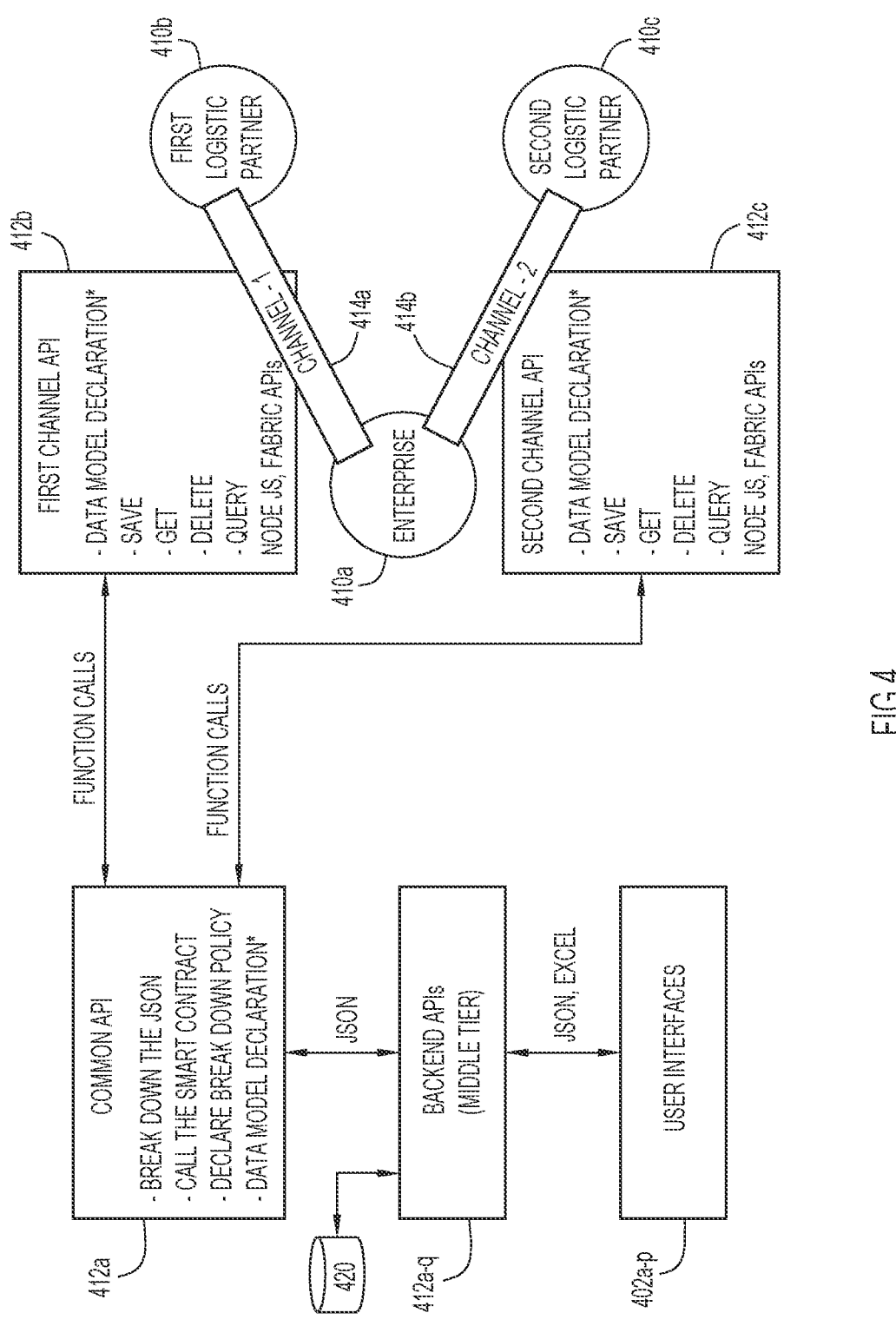
FIG. 4 is a diagram illustrating an application programming interface of blockchain nodes for interacting with a blockchain, according to an example embodiment.

FIG. 7 is a hardware block diagram of a computing device 700 that may perform functions associated with any combination of operations in connection with the techniques depicted in FIGS. 1-6, according to various example embodiments, including, but not limited to, operations of one of user devices of the entities 110*a-n* or the freight management engine 120 of FIGS. 1 and 3, one of the blockchain nodes of the enterprise 410*a*, the first logistic partner 410*b*, and the second logistic partner 410*c* of FIG. 4, and/or some of the operations of the blockchain channel 500 of FIG. 5 such as the enterprise blockchain node 510*a* or the partner blockchain node 510*b*. It should be appreciated that FIG. 7 provides only an illustration of one example embodiment and does not imply any limitations regarding the environments in which different example embodiments may be implemented. Many modifications to the depicted environment may be made.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 716, a display screen (touch screen on a mobile device), or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a network interface to receive and send packets in a network and a processor. The processor is configured to perform various operations including obtaining, from a first blockchain node of an enterprise, via a blockchain channel, a rate card data record that includes at least one unique identifier, primary information about the rate card data record, and a plurality of data values that change over time. The rate card data record is in a form of a distributed ledger blockchain. The operations further include generating, using a set of rules in a smart contract, a data transaction based on one or more values in the rate card data record. The data transaction is also in the form of the distributed ledger blockchain. The operations further include providing, to a second blockchain node, via the blockchain channel, the data transaction that triggers an executable event.

In yet another example embodiment, one or more non-transitory computer readable storage media encoded with instructions are provided. When the media is executed by a processor, the instructions cause the processor to execute a method that involves obtaining, from a first blockchain node of an enterprise, via a blockchain channel, a rate card data record that includes at least one unique identifier, primary information about the rate card data record, and a plurality of data values that change over time. The rate card data record is in a form of a distributed ledger blockchain. The method further involves generating, using a set of rules in a smart contract, a data transaction based on one or more values in the rate card data record. The data transaction is also in the form of the distributed ledger blockchain. The method further includes providing, to a second blockchain node, via the blockchain channel, the data transaction that triggers an executable event.

In yet another example embodiment, a system is provided that includes the devices and operations explained above with reference to FIGS. 1-7.

The programs described herein (e.g., control logic 720) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory elements(s) 704 can store data, software, code, instructions (e.g., processor instructions), logic, parameters, combinations thereof, and/or the like used for operations described herein. This includes the storage 706 and/or memory elements(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining, from a first blockchain node of an enterprise, via a blockchain channel, a data object that includes at least one executable instruction and a rate card data record that includes at least one unique identifier, primary information about the rate card data record, and a plurality of data values that change over time and include at least one first data value that is being negotiated and at least one second data value that is an approved data value, and one or more keys for authenticating the data object, wherein the rate card data record is in a form of a distributed ledger blockchain;

performing a rate negotiation process, using a smart contract, including:

parsing the data object using the at least one executable instruction;

determining a structure of the data object based on a break-down policy;

retrieving at least one required value which is the at least one first data value while omitting to retrieve a non-required value in the rate card data record while performing the rate negotiation process;

transforming the at least one first data value in a first field of the rate card data record in which the at least one first data value is not used in generating event transactions into the at least one second data value based on an authentication from the first blockchain node of the enterprise using the one or more keys such that the at least one first data value is enabled for generating the event transactions, and recording, using the smart contract, an updated rate card data record into a blockchain;

generating, using a set of rules in the smart contract, a data transaction based on one or more values in the updated rate card data record, wherein the data transaction is in the form of the distributed ledger blockchain; and providing, to a second blockchain node, via the blockchain channel, the data transaction that triggers an executable event.

2. The method of claim 1, further comprising:

obtaining, from the second blockchain node, via the blockchain channel, a validation of the data transaction based on performing a transaction reconciliation process in which the data transaction is validated by determining whether correct data values from the rate card data record are applied in generating the data transaction; and generating the executable event based on obtaining the validation of the data transaction.

3. The method of claim 2, wherein the executable event is a shipment event and generating the executable event includes:

integrating, using the smart contract, with one or more transport management systems to cause a shipment of one or more products.

4. The method of claim 2, wherein the executable event is a payment event and generating the executable event includes:

generating, using the smart contract, a payment transaction in which a payment is rendered; and recording, using the smart contract, the payment into the blockchain.

5. The method of claim 1, wherein the at least one unique identifier in the rate card data record includes a plurality of encoded attributes of the primary information including a transport lane, a status of the rate card data record, and a plurality of identifiers of a plurality of entities that are authorized to collaboratively exchange information using the blockchain channel.

6. The method of claim 1, wherein generating the data transaction includes:

generating a unique data transaction identifier;

assigning a status for the data transaction;

determining a validity of each of a plurality of charges in the data transaction based on the plurality of data values in the rate card data record;

generating a first set of charge values from the plurality of charges determined to be valid; and generating a second set of charge values from the plurality of charges determined to have one or more errors.

7. The method of claim 1, further comprising:

obtaining additional rate card data records, which are older versions of the rate card data record;

determining at least one trend based on the rate card data record and the additional rate card data records; and generating at least one insight based on the at least one trend.

8. The method of claim 1, wherein the first blockchain node includes a first peer instance for securely communicating with the second blockchain node, a first certificate of authority to authenticate the first blockchain node onto the blockchain channel, a first ledger that includes the rate card data record and the data transaction, and a first chain code that includes the smart contract, and wherein the second blockchain node includes a second peer instance for securely communicating with the first blockchain node, a second certificate of authority to authenticate the second blockchain node onto the blockchain channel, a second ledger that is synchronized with the first ledger, and a second chain code that is a copy of the first chain code.

9. The method of claim 1, wherein the data object is provided in a Java Script Object Notation (JSON) message.

10. The method of claim 1, wherein the break-down policy ensures that the data object is split such that the non-required value is omitted while performing create, read, update or delete operations on the data object.

11. An apparatus comprising:

a network interface to receive and send packets in a network; and a processor, wherein the processor is configured to perform operations comprising:

obtaining, from a first blockchain node of an enterprise, via a blockchain channel, a data object that includes at least one executable instruction and a rate card data record that includes at least one unique identifier, primary information about the rate card data record, and a plurality of data values that change over time and include at least one first data value that is being negotiated and at least one second data value that is an approved data value, and one or more keys for authenticating the data object, wherein the rate card data record is in a form of a distributed ledger blockchain;

performing a rate negotiation process, using a smart contract, including:

parsing the data object using the at least one executable instruction;

determining a structure of the data object based on a break-down policy:

retrieving at least one required value which is the at least one first data value while omitting to retrieve a non-required value in the rate card data record while performing the rate negotiation process;

transforming the at least one first data value in a first field of the rate card data record in which the at least one first data value is not used in generating event transactions into the at least one second data value based on an authentication from the first blockchain node of the enterprise using the one or more keys such that the at least one first data value is enabled for generating the event transactions, and recording, using the smart contract, an updated rate card data record into a blockchain;

generating, using a set of rules in the smart contract, a data transaction based on one or more values in the updated rate card data record, wherein the data transaction is in the form of the distributed ledger blockchain; and providing, to a second blockchain node, via the blockchain channel, the data transaction that triggers an executable event.

12. The apparatus of claim 11, wherein the processor is configured to perform:

obtaining, from the second blockchain node, via the blockchain channel, a validation of the data transaction based on performing a transaction reconciliation process in which the data transaction is validated by determining whether correct data values from the rate card data record are applied in generating the data transaction; and generating the executable event based on obtaining the validation of the data transaction.

13. The apparatus of claim 12, wherein the executable event is a shipment event and the processor is configured to generate the executable event by:

integrating, using the smart contract, with one or more transport management systems to cause a shipment of one or more products.

14. The apparatus of claim 12, wherein the executable event is a payment event and the processor is configured to generate the executable event by:

generating, using the smart contract, a payment transaction in which a payment is rendered; and recording, using the smart contract, the payment into the blockchain.

15. The apparatus of claim 11, wherein the at least one unique identifier in the rate card data record includes a plurality of encoded attributes of the primary information including a transport lane, a status of the rate card data record, and a plurality of identifiers of a plurality of entities that are authorized to collaboratively exchange information using the blockchain channel.

16. The apparatus of claim 11, wherein the processor is configured to generate the data transaction by:

generating a unique data transaction identifier;

assigning a status for the data transaction;

determining a validity of each of a plurality of charges in the data transaction based on the plurality of data values in the rate card data record;

generating a first set of charge values from the plurality of charges determined to be valid; and generating a second set of charge values from the plurality of charges determined to have one or more errors.

17. One or more non-transitory computer readable storage media encoded with software comprising computer executable instructions that, when executed by a processor, cause the processor to perform a method including:

obtaining, from a first blockchain node of an enterprise, via a blockchain channel,, a data object that includes at least one executable instruction and a rate card data record that includes at least one unique identifier, primary information about the rate card data record, and a plurality of data values that change over time and include at least one first data value that is being negotiated and at least one second data value that is an approved data value, and one or more keys for authenticating the data object, wherein the rate card data record is in a form of a distributed ledger blockchain;

performing a rate negotiation process, using a smart contract, including:

parsing the data object using the at least one executable instruction;

determining a structure of the data object based on a break-down policy;

retrieving at least one required value which is the at least one first data value while omitting to retrieve a non-required value in the rate card data record while performing the rate negotiation process;

transforming the at least one first data value in a first field of the rate card data record in which the at least one first data value is not used in generating event transactions into the at least one second data value based on an authentication from the first blockchain node of the enterprise using the one or more keys such that the at least one first data value is enabled for generating the event transactions, and recording, using the smart contract, an updated rate card data record into a blockchain;

generating, using a set of rules in the smart contract, a data transaction based on one or more values in the updated rate card data record, wherein the data transaction is in the form of the distributed ledger blockchain; and providing, to a second blockchain node, via the block-chain channel, the data transaction that triggers an executable event.

18. The one or more non-transitory computer readable storage media according to claim 17, wherein the computer executable instructions cause the processor to further perform:

obtaining, from the second blockchain node, via the blockchain channel, a validation of the data transaction based on performing a transaction reconciliation process in which the data transaction is validated by determining whether correct data values from the rate card data record are applied in generating the data transaction; and generating the executable event based on obtaining the validation of the data transaction.

19. The one or more non-transitory computer readable storage media according to claim 18, wherein the executable event is a shipment event and the computer executable instructions cause the processor to generate the executable event by:

integrating, using the smart contract, with one or more transport management systems to cause a shipment of one or more products.

20. The one or more non-transitory computer readable storage media according to claim 18, wherein the executable event is a payment event and the computer executable instructions cause the processor to generate the executable event by:

generating, using the smart contract, a payment transaction in which a payment is rendered; and recording, using the smart contract, the payment into the blockchain.

* * * * *